United States Patent

Hell

[11] Patent Number: 6,021,997
[45] Date of Patent: Feb. 8, 2000

[54] PROPORTIONAL POWER CONTROL VALVE

[75] Inventor: Franz-Rudolf Hell, Lebach, Germany

[73] Assignee: Flutec Fluidtechnische Gerate GmbH, Germany

[21] Appl. No.: 09/033,666

[22] Filed: Mar. 3, 1998

[30] Foreign Application Priority Data

Mar. 14, 1997 [DE] Germany .................. 197 10 636

[51] Int. Cl.[7] .................................................. F16K 31/02
[52] U.S. Cl. .................................. 251/30.04; 251/30.03; 251/129.07
[58] Field of Search ................... 251/30.03, 30.04, 251/129.07

[56] References Cited

U.S. PATENT DOCUMENTS

| | | | |
|---|---|---|---|
| 3,405,906 | 10/1968 | Keller | 251/30.04 |
| 3,903,919 | 9/1975 | Zeuner | 251/44 X |
| 4,463,929 | 8/1984 | Dantlgraber et al. | 251/44 |
| 4,553,732 | 11/1985 | Brundage et al. | 251/43 X |
| 4,746,093 | 5/1988 | Scanderbeg | 251/30.04 |
| 4,858,886 | 8/1989 | Tatara | 251/129.07 |
| 5,020,772 | 6/1991 | Degenfelder et al. | 251/44 X |
| 5,174,544 | 12/1992 | Emanie | 251/44 X |
| 5,205,531 | 4/1993 | Kolchinsy | 251/30.04 |
| 5,538,026 | 7/1996 | Kazi | 251/30.04 X |

FOREIGN PATENT DOCUMENTS

| | | |
|---|---|---|
| 4416279A1 | 5/1995 | Germany . |
| 19624884A1 | 1/1997 | Germany . |

*Primary Examiner*—Denise L. Ferensic
*Assistant Examiner*—Meredith H. Schoenfield
*Attorney, Agent, or Firm*—Roylance, Abrams, Berdo & Goodman, L.L.P.

[57] ABSTRACT

A proportional power control valve includes a solenoid controlling a main piston. The main piston is in fluid communication, through a feed opening, with the valve intake, and cooperates with a servo-control piston to block the valve intake from the valve outlet. The servo-control piston is part of a cylindrical armature controllable by an electromagnet of the solenoid, and can be moved counter to the bias of a locking spring. The locking spring is guided in a receiving chamber in the cylindrical armature. Since the receiving chamber of the cylindrical armature is in continuous fluid communication with the valve intake through a connection formed in the armature by an attenuation opening, the resulting proportional power control valve allows the continuous adjustment of the volume flow of a pressure medium or pressurized fluid dependent upon the level of electric control current supplied to the electromagnet.

14 Claims, 1 Drawing Sheet

PROPORTIONAL POWER CONTROL VALVE

FIELD OF THE INVENTION

The present invention relates to a proportional power control valve with an electric solenoid (electromagnetic system) controlling a main piston. A feed opening is in fluid communication with the valve intake through the main piston. The main piston cooperates with a servo-control piston to block the valve intake from the valve outlet. The servo-control piston is part of a cylindrical armature (a magnet armature) controllable by an electromagnet of the solenoid. The armature is movable counter to the effect of a first locking spring guided in a receiving chamber of the cylindrical armature.

BACKGROUND OF THE INVENTION

An electrical-magnetic proportional pressure control valve is disclosed in DE 196 24 884 A1. This pressure control valve has a recovery channel, configured with a piston between the compression chamber and the discharge connection. The opening and closing of the control valve can be controlled by the servo-control valve. The armature of the solenoid controls the servo-control valve, in order to correspondingly control the opening and closing of the recovery channel. In this manner, movement of the servo-control valve as a result of deviation of the fluid pressure in the compression chamber is prevented, and is not effected by the electric-magnetic force produced by the solenoid.

Undesired control deviations of the control valve can be considerably diminished by this means.

German DE 44 16 279 A1 discloses a magnet valve having an electrically excitable solenoid with an armature guided therein and configured without pressure. A longitudinal channel extends all the way through the armature. Connecting chambers of the magnet valve are separated from one another by a gasket on the armature. Relatively extensive overflow cross-sections or profiles are made available, while avoiding anticipatory control in direct passages.

SUMMARY OF THE INVENTION

Objects of the present invention are to provide a proportional power control valve in which continuous flow adjustments of a pressure medium or compressed fluid is possible, dependent upon the level and extend of electric control of the flow.

The foregoing objects are basically obtained by a proportional control valve, comprising a valve body with a valve intake and a valve outlet. A main piston is mounted for reciprocal movement in the valve body between an open position allowing fluid flow through the valve body from the valve intake to the valve outlet and a closed position blocking fluid flow between the valve intake and the valve outlet. The main piston has a feed opening in continuous fluid communication with the valve intake. A servo-control piston is coupled to the main piston and has a longitudinal channel extending through it. A solenoid includes an electromagnet and a cylindrical armature movably mounted relative to and responsive to the electromagnet and connected to the servo-control piston for movement with it. The armature has a receiving chamber in continuous fluid communication with the valve intake through the longitudinal channel and through an attenuation opening in the armature. A first locking spring in the receiving chamber biases the armature and the servo-control piston away from the electromagnet.

Since the receiving chamber of the cylindrical armature is in continuous fluid communication with the valve intake through the longitudinal channel extending through the servo-control piston and since that continuous fluid communication is formed in the armature by an attenuation opening, a continuous adjustment of the volume flow of a pressure medium or compressed fluid is attained, dependent upon the level of electric control.

Additionally, the number of individual parts is reduced as a result of the integration of the servo-control operation into the main operation. This construction is cost-effective and leads to considerably more compact proportional power control valve which can be constructed simply as a detachable accessory.

Other objects, advantages and salient features of the present invention will become apparent from the following detailed description, which, taken in conjunction with the annexed drawing, discloses a preferred embodiment of the invention.

BRIEF DESCRIPTION OF THE DRAWINGS

Referring to the drawing which forms a part of this disclosure.

DETAILED DESCRIPTION OF THE INVENTION

Figure 1:
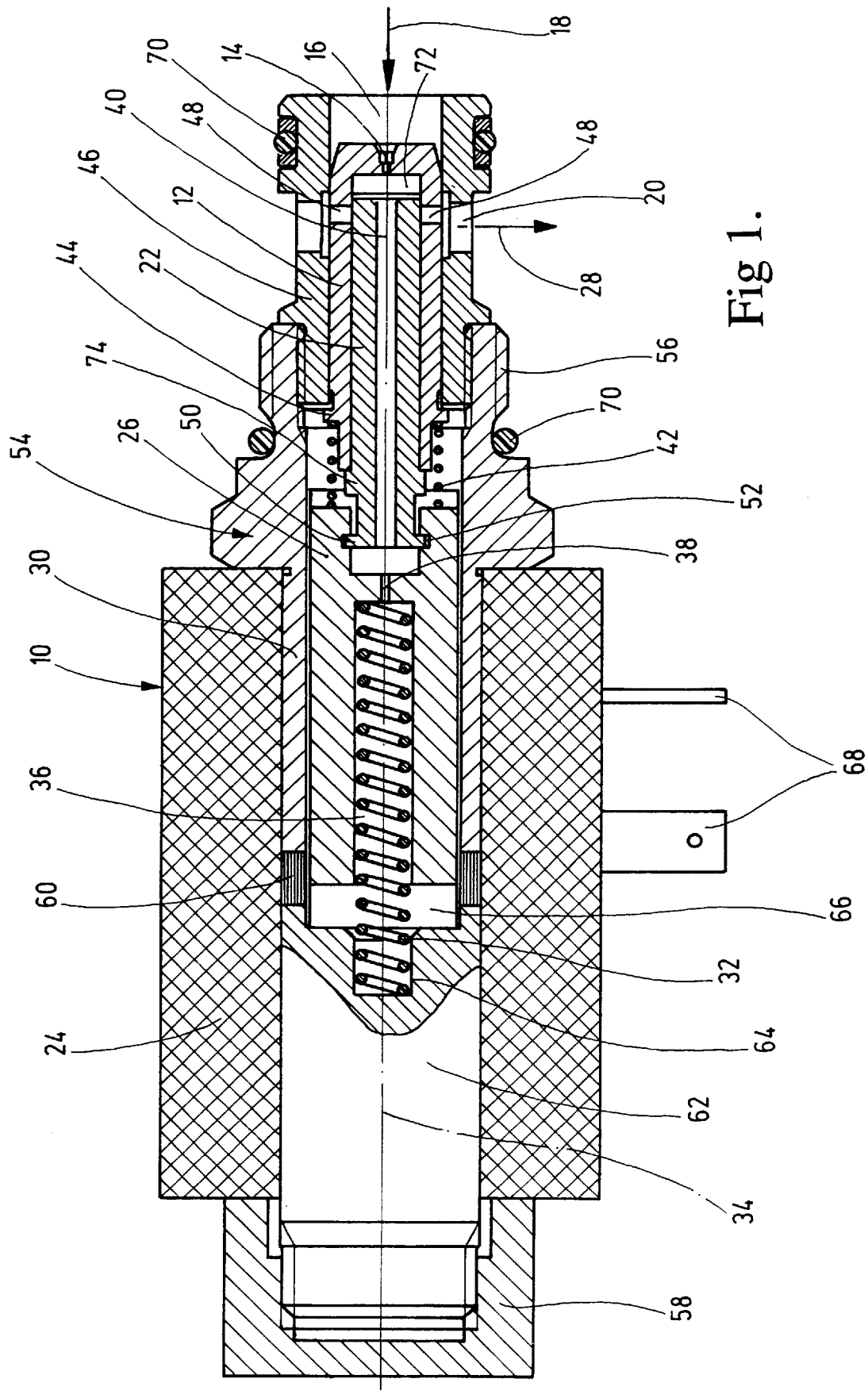
FIG. 1 is a side elevational view in section of a proportional power control valve according to the present invention.

The proportional power control valve is provided with an electrical solenoid, indicated in its entirety as 10. This solenoid controls a main piston 12. Main piston 12 is in continuous, fluid communication with the valve intake 16, through a feed opening 14. Feed opening 14 is in the form of a borehole, tapering toward the interior of the valve. The fluid intake direction is shown in the drawing by arrow 18. Main piston 12 operates with a servo-control piston 22 to block intake 16 from valve outlet 20. Servo-control piston 22 is part of an armature or core 26 controllable by an electromagnet 24 of solenoid 10. The direction of dispersal of the fluid is indicated with an arrow 28 as the fluid exits valve outlet 20.

Inside its casing, electromagnet 24 supports a magnet tube 30. Armature 26 is movable in tube 30 counter to the effect of a first locking spring 32. First locking spring 32 is constructed as a compression spring and is guided or received in a receiving chamber 36 of cylindrical armature 26. The chamber and spring extend along the longitudinal axis 34 of the proportional power control valve. The armature is in continuous, fluid communication with valve intake 16 through a attenuation opening or borehole 38 and through a longitudinal channel 40 extending in servo-control piston 22 and along the longitudinal axis 34.

A second locking spring 42 is arranged between armature 26 and main piston 12, and is constructed as a compression spring. Main piston 12 has an annular stop collar 44 abutting one end of second locking spring 42. The other end of second locking spring 42 is in contact with the front surface of armature 26, which front surface is oriented in the direction of valve intake 16. Annular, outwardly widening stop collar 44 extends out from the outer surface of main piston 12 for contacting an end surface of valve body 46. Valve body 46 comprises valve intake 16, as well as valve outlet 20. Main piston 12 is provided with two discharge openings 48 extending transverse to longitudinal axis 34 and facing one another radially opposite one another relative to longitudinal axis 34. The discharge openings can be covered by servo-control piston 22, and open into valve outlet 20. Outlet 20 includes an annular groove on the inner surface of valve body 46.

Servo-control piston 22 comprises stop collar 50 received with radial play in an associated radial outlet 52 of armature 26. The magnet tube 30, arranged between armature 26 and valve body 46, is formed with a screw-in die 54 having an internally thread part 56. Magnet tube 30 is pressurized by an end cap or protective cap 58 which separates the magnet tube from the environment. A stationary base or support piston 62 extends between end cap 58 and pressure-sealed magnet tube 30, and is magnetically separated from magnet tube 30 by a separator 60. First locking spring 32 is supported on base or support piston 62 in an annular outlet 64 receiving an end of the spring. When the proportional power control valve shown in the drawing is in its closed or shut-off position, a free space 66 is formed between base or support piston 62 and piston-like armature 26 such that the facing surfaces between the parts of support or base piston 62 and armature 26 are spaced by dimensions equal to the maximum thrust movement of servo-control piston 22 for the release of the two discharge openings 48.

Only a slight volume of fluid leakage passes through the running clearance between main piston 12 and servo-control piston 22 to valve outlet 20, as conditioned by the manufacturing tolerances. Also, a slight volume of fluid leakage can pass through the running clearance of main piston 12 and servo-control piston 22 to valve intake 16. For the purpose of control, electromagnet 24 is provided with electric connection points 68 in the form of contact plugs.

Valve body 46 is provided with exterior threading on its outer surface which engages the interior threading or threaded part 56. Threaded part 56, in turn, has exterior threading to enable the entire proportional power control valve or unit to be securely connected as part of screw-in die 54 with controllable hydraulic parts, such as machine housings or the like. For the manufacture of this connection, both valve body 46 and thread part 56, in the conventional manner, have annular gaskets 70.

Between the end surface of servo-control piston 22 facing valve intake 16 and the adjacent end of main piston 12 a fluid intake chamber 72 is provided which opens on feed opening 14 and longitudinal channel 40 extending all the way through servo-control piston 22. Feed opening 14 and longitudinal channel 40, as well as attenuation opening 38, are coaxial to longitudinal axis 34 of the proportional power control valve. In addition to and spaced from first stop collar 50, servo-control piston 22 has a second stop collar 74 surrounded by the second locking spring 42. Stop collar 74 has one end surface supported on the end of main piston 12 facing armature 26.

For better understanding of the proportional power control valve of the present invention, its operation is described in greater detail as follows.

When electromagnet 24 carries no current, the proportional power control valve is shut off or closed, in other words, when valve intake 16 is separated or blocked from the valve outlet 20. Through armature 26, first locking spring 32 presses servo-control piston 22 with its other stop collar 74 on main piston 12. Main piston 12, in turn, is supported with its stop collar 44 on valve body 46. With fluid pressure on valve intake 16, the pressure is applied on those parts through the feed opening 14 effecting a servo-control and the longitudinal channel in servo-control piston 22 on the reverse side of main piston 12. The fluid pressure also passes through attenuation opening 38 and receiving chamber 36 of first locking spring 32 in armature 26 onto the reverse or opposite side of the armature. Main piston 12, servo-control piston 22 and armature 26 are thereby pressure-balanced, and the valve remains in its closed position show in the drawing as a result of the pressure force of first locking spring 32. With fluid pressure applied on valve outlet 20, the proportional power control valve likewise remains shut off or closed because of the lack of different surface areas on the ends of main piston 12 and servo-control piston 22.

With current flowing through the winding of electromagnet 24, coming through plug connections 68, armature 26 and radially movable and axially form-fitting servo-control piston 22 connected with it are moved counter to the pressure force of first locking spring 32, causing a predeterminable shift, which is proportional to the degree of the applied coil current. With a predeterminable certain shift, servo-control piston 22 begins to open the two discharge openings 48 lying opposite one another, effecting a servo-control.

When there is a pressure drop between valve intake 16 and valve outlet 20, the fluid flow entering through feed opening 14 produces a pressure differential between the feed end of main piston 12 and its reverse end facing first locking spring 32. This pressure differential provides a force in the opening direction on main piston 12. Another increase of the coil input current allows main piston 12 to follow the shift of servo-control piston 22. As a result of a predeterminable shaping of main piston 12 on its end facing valve intake 16, following a certain shift a certain diameter passage between valve intake 16 and valve outlet 20 is freed. This passage increases progressively and uniformly, corresponding to increasing shift. Preferably, the end surface of main piston 12 is frustoconical, as shown in the drawing.

If the electric coil is not further increased and consequently remains at the same level, main piston 12 takes a position in which the engaging and opposing forces, composed of a hydraulic force in opening direction and a force of second locking spring 42 in a closing direction, are balanced because of the pressure differential produced by the setting-dependent variable flow of the servo-control volume. Upon a decrease of electric coil current for solenoid 10, first locking spring 32 presses armature 26 and servo-control piston 22 back towards its original and illustrated position. This closes discharge openings 48 in the main piston 12 and the servo-control flow is interrupted. Thus, main piston 12 is again pressure-balanced. Because of the force of second locking spring 42, servo-control piston 22 can then be shifted. If electromagnet 24 is deprived of current, first locking spring 32 presses servo-control piston 22 and main piston 12 back into the original setting, and valve intake 16 and valve outlet 20 are separated or blocked from one another. The hydraulic condition or position recovery of main piston 12 then occurs through the relevant discharge opening 48 in main piston 12, which, for servo-control piston 22, is in the configuration of an adjustment valve.

With proportional power control valve, according to the present invention, the integration of the servo-control operation into the main operation is achieved with a reduction in the number of separate parts. The reduction in parts is cost-effective and leads to remarkably more compact dimensions of the proportional power control valve when constructed as a detachable accessory part.

While a particular embodiment has been chosen to illustrate the invention, it will be understood by those skilled in the art that various changes and modifications can be made therein without departing from the scope of the invention as defined in the appended claims.

What is claimed is:

1. A proportional control valve, comprising a valve body with a valve intake and a valve outlet;

a main piston mounted for reciprocal movement in said valve body between an open position allowing fluid flow through said valve body from said valve intake to said valve outlet and a closed position blocking fluid flow between said valve intake and said valve outlet, said main piston having a feed opening in continuous fluid communication with said valve intake;

a servo-control piston coupled to said main piston, and having a longitudinal channel extending therethrough and a stop collar;

discharge openings in said main piston closable by said servo-control piston and opening directly on said valve outlet;

a solenoid including an electromagnet and a cylindrical armature movably mounted relative to and responsive to said electromagnet and connected to said servo-control piston for movement therewith, said armature having a receiving chamber in continuous fluid communication with said valve intake through said longitudinal channel and through an attenuation opening in said armature and having a radial cutout receiving said stop collar with some radial play; and a first locking spring in said receiving chamber and biasing said armature and said servo-control piston away from said electromagnet.

2. A proportional control valve according to claim 1 wherein a second locking spring is between said armature and said main piston.

3. A proportional control valve according to claim 2 wherein said main piston comprises a stop collar releasably engagable with said valve body.

4. A proportional control valve according to claim 1 wherein said armature is received with a magnet tube, said magnet tube comprises a threaded part threadedly engaged with said valve body.

5. A proportional control valve according to claim 4 wherein said magnet tube is pressure tight.

6. A proportional control valve, comprising a valve body with a valve intake and a valve outlet;

a hollow main piston mounted for reciprocal movement in said valve body between an open position allowing fluid flow through said valve body from said valve intake to said valve outlet and a closed position blocking fluid flow between said valve intake and said valve outlet, said main piston having a feed opening in continuous fluid communication with said valve intake;

a servo-control piston coupled to and received within said main piston and having a longitudinal channel extending therethrough;

a solenoid including an electromagnet and a cylindrical armature movably mounted relative to and responsive to said electromagnet and connected to said servo-control piston for movement therewith, said armature having a receiving chamber therein in continuous fluid communication with said valve intake through said longitudinal channel and through an attenuation opening in said armature; and a first locking spring located in said receiving chamber and engaging said armature to bias said armature and said servo-control piston away from said electromagnet and toward said main piston.

7. A proportional control valve according to claim 6 wherein a second locking spring is between and engages said armature and said main piston.

8. A proportional control valve according to claim 7 wherein said main piston comprises a stop collar releasably engagable with said valve body.

9. A proportional control valve according to claim 8 wherein said main piston comprises discharge openings therein closable by said servo-control piston and being adjacent and in fluid communication with said valve outlet.

10. A proportional control valve according to claim 6 wherein said servo-control piston comprises a stop collar;

said armature comprises a radial cutout; and said stop collar is received in said radial cutout with some radial play.

11. A proportional control valve according to claim 6 wherein said armature is received with a magnet tube, said magnet tube having a threaded part threadedly engaged with said valve body.

12. A proportional control valve according to claim 11 wherein said magnet tube is pressure tight.

13. A proportional control valve according to claim 6 wherein said servo-control valve and said armature are coupled at adjacent ends thereof and extend in opposite directions from said adjacent end.

14. A proportional control valve according to claim 6 wherein one end of said first locking spring engages an internal radially extending surface of said armature; and an opposite end of said first locking spring engages a support piston coupled to said valve body.

* * * * *